United States Patent

[11] 3,627,947

[72] Inventors Henry Mann
Holmdel, N.J.;
Joseph A. Whiteaker, Rock Hill, S.C.

[21] Appl. No. 879,283
[22] Filed Nov. 24, 1969
[45] Patented Dec. 14, 1971
[73] Assignee Bell Telephone Laboratories, Incorporated
Murray Hill, N.J.

[54] MEASUREMENT OF MINIMUM OF A SERIES OF TIME INTERVALS
20 Claims, 40 Drawing Figs.

[52] U.S. Cl. .......... 178/69 A, 179/175.2 A
[51] Int. Cl. .......... H04l 25/02, H04m 1/24
[50] Field of Search .......... 178/69 R, 69 A; 179/175.2 A; 328/111, 130, 162; 307/234

[56] References Cited
UNITED STATES PATENTS 3,025,349 3/1962 Peterson .......... 178/69 A
3,084,220 4/1963 Britt .......... 178/69 A
3,182,127 5/1965 Wiese .......... 178/69 A
3,420,950 1/1969 Britt .......... 178/69 A

*Primary Examiner*—Kathleen H. Claffy
*Assistant Examiner*—Douglas W. Olms
*Attorneys*—R. J. Guenther and James Warren Falk

ABSTRACT: The circuit uses digital technique to measure minimum break (or make) interval over a series of telephone dial pulses. During the first break, clock pulses are serially counted in a binary coded decimal up-counter A. At the end of the first break, the nine's complement of the A count is transferred into a binary coded decimal reentrant up-counter B of the same count capacity as A; and, the old (first) count is erased from A (i.e., A is reset to zero count). During the second (new) break, clock pulses are serially counted in A while being serially added (complementary addition equals subtraction of old count from new count) to the count in B. If the count in B exceeds the capacity of B, further counting in A is stopped. At the end of each new measured break, A contains the minimum of the old and new counts, the nine's complement of the minimum is transferred to B, the A counter is returned to zero count, and the process repeats. Visual display is provided of the minimum count by translation from clock pulse count in B to milliseconds.

INVENTORS: H. MANN
J. A. WHITEAKER
BY [signature]
ATTORNEY

NAND

NAND

INVERTER

INVERTER

OR

OR

AND

AND

AND

DELAY

DELAY

DELAY

SINGLE SHOT

SINGLE SHOT

SINGLE SHOT

DELAYED SINGLE SHOT

DELAYED SINGLE SHOT

DELAYED SINGLE SHOT

REGENERATION

REGENERATION

REGENERATION

D-TYPE FLIP FLOP

S/R FLIP FLOP

S/R FLIP FLOP

2421 BCD COUNTER

2421 BCD COUNTER

MEASUREMENT OF MINIMUM OF A SERIES OF TIME INTERVALS

BACKGROUND OF THE INVENTION

This invention relates generally to the field of time interval measurement and particularly to the measurement of the shortest or minimum time interval among a series of time intervals.

The prior art, such as U.S. Pat. No. 3,084,220 to H. J. Britt of Apr. 2, 1963, has generally concerned itself with measuring a series of time intervals while comparing each measurement with a standard minimum time interval and providing some indication, generally by a meter or other visual indicator, of the largest deviation, if any, from that standard minimum. Such prior technique could indicate a minimum of a series of time intervals only if at least one such interval was of less duration than the prescribed standard. While means generally has been provided in such prior circuitry for setting that test standard within limits, such a limit nevertheless precluded the measurement over a series of time intervals of the minimum unless at least one measured time interval was shorter than the prescribed standard.

The present invention provides an arrangement for measuring the minimum of a series of time intervals with the time intervals themselves being the only criteria of that minimum.

SUMMARY OF THE INVENTION

In broad aspect, the present invention contemplates circuitry for measuring each time interval in a series of time intervals and for registering a measure of the shortest or minimum time interval over the series.

More particularly, the present invention provides means for measuring a first time interval, means for measuring a succeeding time interval, means for comparing the measurements, and means for retaining for further comparison the shorter of the two.

Still more particularly, the present invention contemplates the use of digital technique where the time intervals are measured by counts of clock pulses.

Still more particularly, the present invention contemplates the use of two pulse count registers controlled by clock pulses to measure successive time intervals by clock pulse counts, to compare each successive measured interval with the previous minimum, and to retain a pulse count indicative of the new or old minimum depending upon the comparison.

Still more particularly, the present invention contemplates two clock pulse counters, one counter being controlled by clock pulses to indicate the difference between the old minimum time interval and the new time interval, the other counter being controlled by clock pulses and by the one counter to indicate the shorter of the old minimum and the new time intervals.

In specific aspect, the present invention contemplates two clock pulse up-counters of the same count capacity, one being a reentrant counter containing the complement of the old minimum pulse count, the other containing zero count, both counters having serially added thereto the new pulse count with the one counter stopping further pulse counting in the other counter whenever the one counter exceeds its count capacity, such that the other counter contains the current minimum pulse count.

BRIEF DESCRIPTION OF THE DRAWING

The drawing consists of FIGS. 1 through 41 arranged on nine sheets as follows.

DETAILED DESCRIPTION

The detailed description of the exemplary embodiment is arranged in four main parts: the Circuit Symbols; the Signals; the Block Diagram; and, the Detailed Circuit Disclosure. These parts will be dealt with in the above order under the indicated headings.

CIRCUIT SYMBOLS

Figure 38:
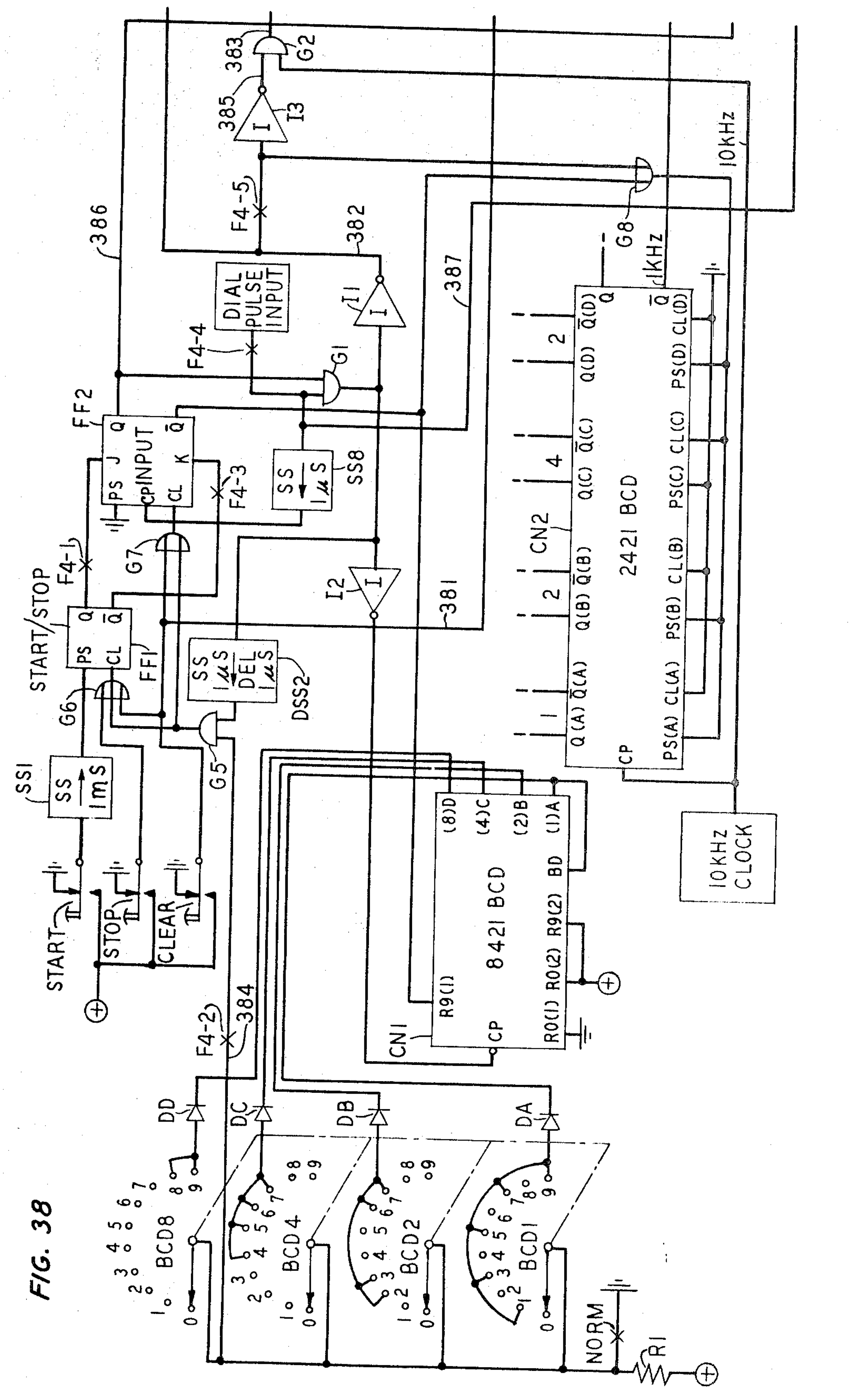
Figure 39:
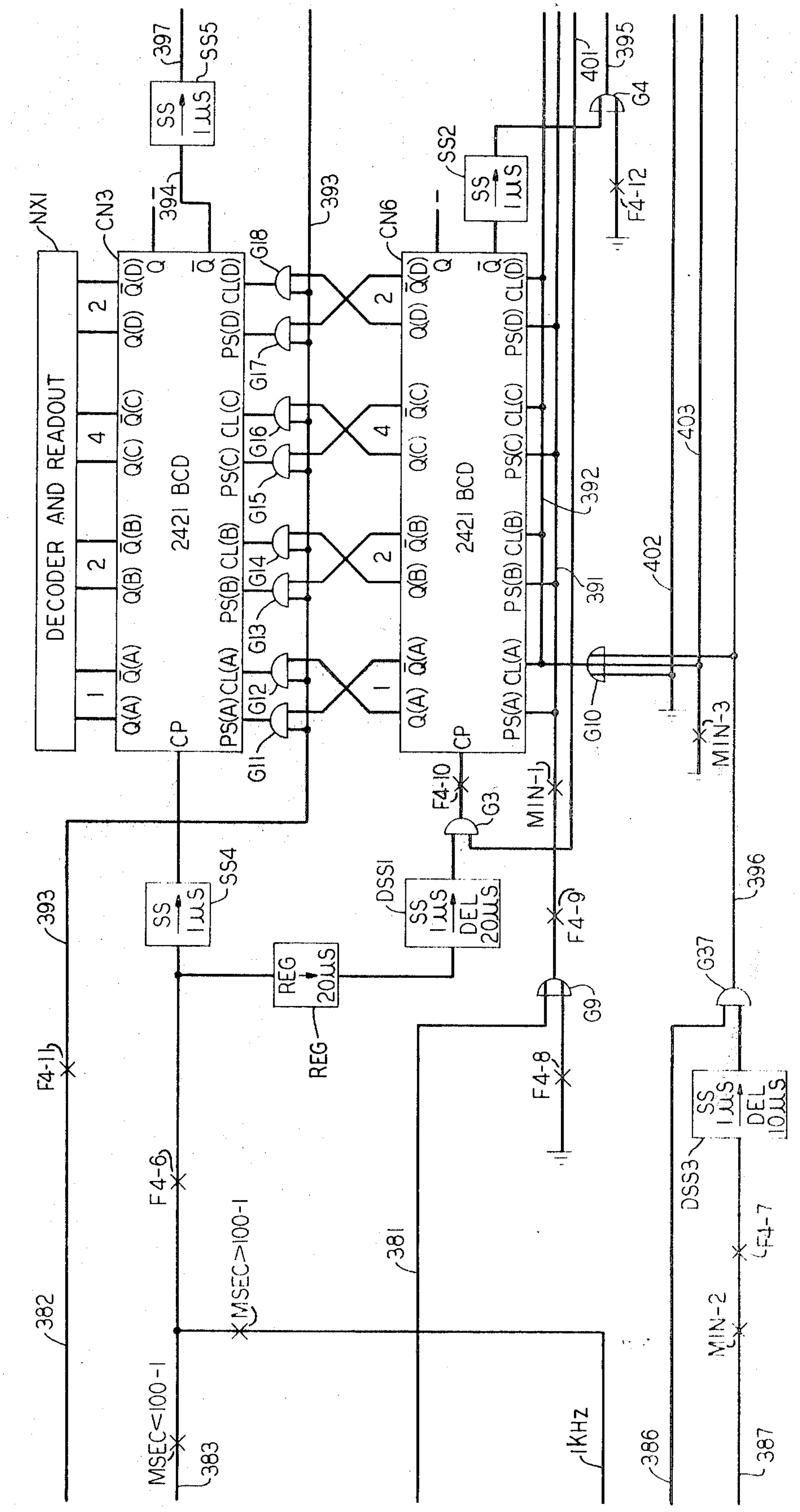
Figure 40:
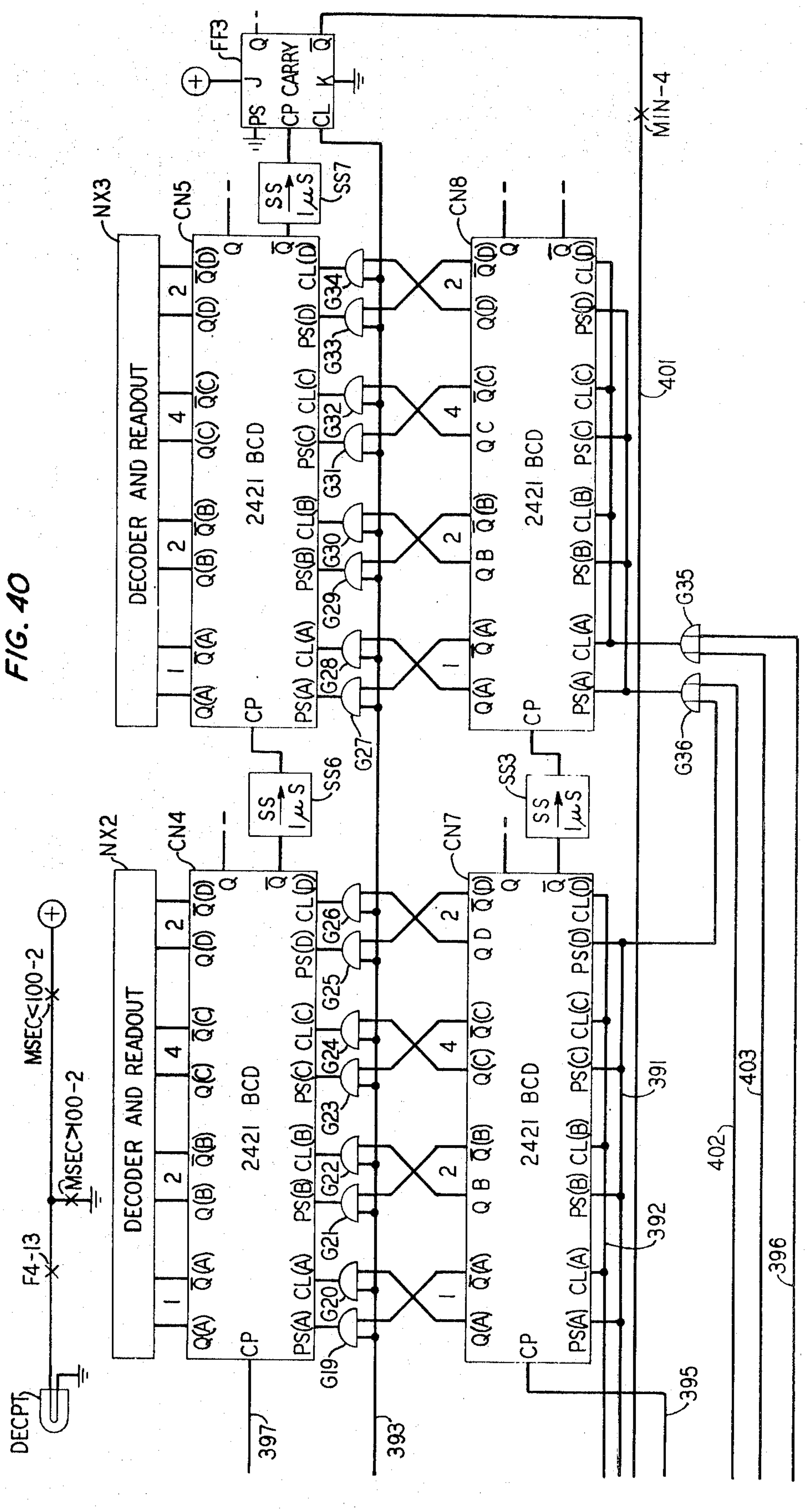

The following, under suitable headings, explain conventions and symbols as used in the detailed circuit layout of FIGS. 38, 39, and 40. In explaining the action of the circuit components, it is assumed that they are connected in the circuit as shown in FIGS. 38, 39 and 40. The diagrams used to shown the action of the components are not intended to represent true waveforms, but merely to illustrate the logic level functions of the circuit components in the context of FIGS. 38, 39 and 40.

Battery and Ground

A circle with a plus sign (+) indicates the positive terminal of a source of direct current supply, the negative terminal of which is assumed to be connected to ground, which is considered as zero potential. The direct current voltage is 5 volts unless otherwise indicated.

Detached Contacts

A crossmark (X) on a conductor indicates a pair of electrical contacts associated with a switch. The contacts complete the circuit path when the switch is operated and open the circuit when the switch is not operated (released).

High and Low Signals

A potential condition, whether steady or transient, is said to be a high logic level if it is 2 volts or more positive. A low logic level condition is a voltage not more positive than about one-half of a volt.

NAND Gate

Figure 3:
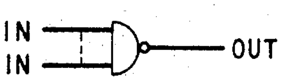

FIG. 3 shows the symbol for a typical NAND gate such as Motorola integrated circuit MC830 and the like.

Figure 4:
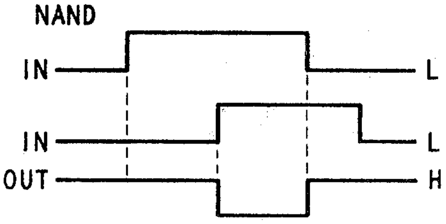

FIG. 4 shows the circuit action of the NAND gate. The output will be low only if all inputs are high; otherwise, the output will be high.

Inverter

Figure 5:
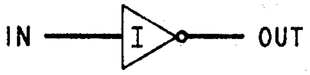

FIG. 5 shows the symbol for a typical inverter such as Motorola integrated circuit MC836 and the like.

Figure 6:
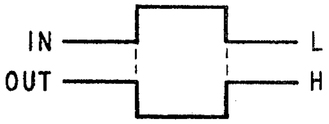

FIG. 6 shows the circuit action of the inverter. The output will be the inverse of the input. That is, a low input produces a high output and a high input produces a low output.

OR Gate

Figure 7:
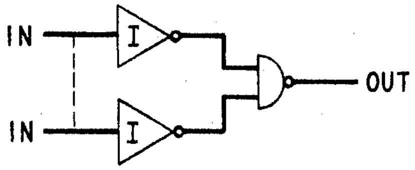

FIG. 7 shows how a NAND gate may be combined with inverters to produce an OR gate.

Figure 8:
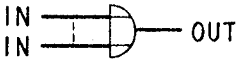

FIG. 8 shows the symbol for an OR gate.

Figure 9:
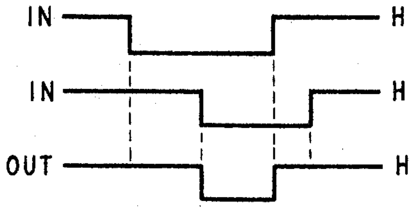

FIG. 9 shows the circuit action of an OR gate. The output will be low only when all inputs are low; otherwise, the output will be high.

AND Gate

Figure 10:
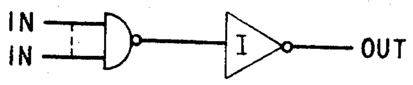

FIG. 10 shows how a NAND gate and an inverter may be combined to produce an AND gate.

Figure 11:
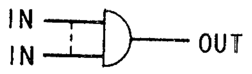

FIG. 11 shows the symbol for an AND gate.

Figure 12:
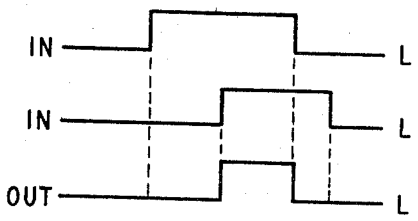

FIG. 12 shows the circuit action of an AND gate. The output will be high only when all inputs are high; otherwise, the output will be low.

Delay

Figure 13:
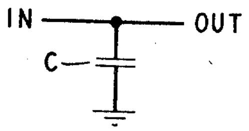

FIG. 13 shows how a capacitor can be connected to a conductor such that a delay is attached to each low-to-high transition. The amount of delay is a function of the value of the capacitor C and the amount and nature of connecting circuits.

Figure 14:
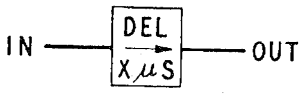

FIG. 14 shows the symbol for a delay circuit with an arrow pointing in the direction of the effect of the delay. The symbol includes the amount of delay (microseconds μsec. or milliseconds msec.) where pertinent.

Figure 15:
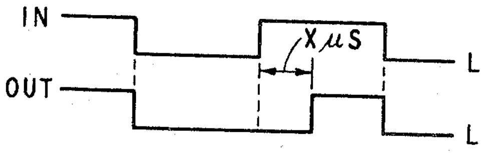

FIG. 15 shows the action of the delay circuit. A low-to-high transition at the input is delayed by $x$ μsec. at the output due to a controllable charging time of capacitor C. No delay to speak of is experienced at the output by a high-to-low transition at the input since the discharge path of capacitor C is arranged to be very fast.

Single-Shot

Figure 16:
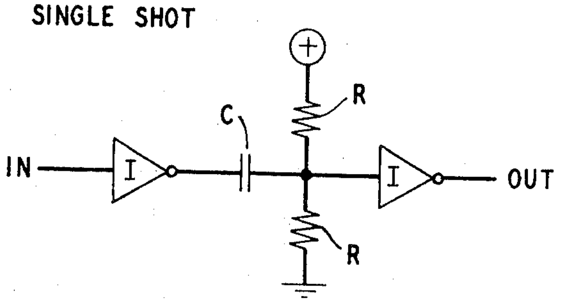

FIG. 16 shows how a single-shot circuit may be made to produce a low-to-high output of a specified short width from a longer low-to-high input.

Figure 17:
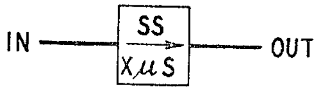

FIG. 17 shows the symbol for a single-shot circuit like FIG. 16.

Figure 18:
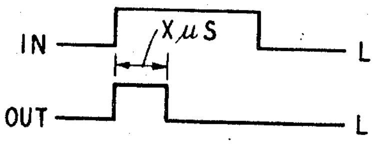

FIG. 18 shows the circuit action of the single-shot. A low-to-high transition at the input will produce at the output a low-to-high transition lasting for $x$ μsec. Normally, the output is low due to the inverter connected between the output and the normally high resistance divider midpoint. Low-to-high transitions at the left terminal of condenser C (same as high-to-low input transition), will have no effect at the output logic level. However, a low-to-high input will produce a high-to-low transition at the left terminal of capacitor C, which will at once cause a high-to-low transition at the divider midpoint, which in turn will produce a low-to-high output. The output will stay high for $x$ μsec. until capacitor C charges to bring the divider midpoint back to a high condition, whereupon the output goes low again.

Delayed Single-Shot

Figure 19:
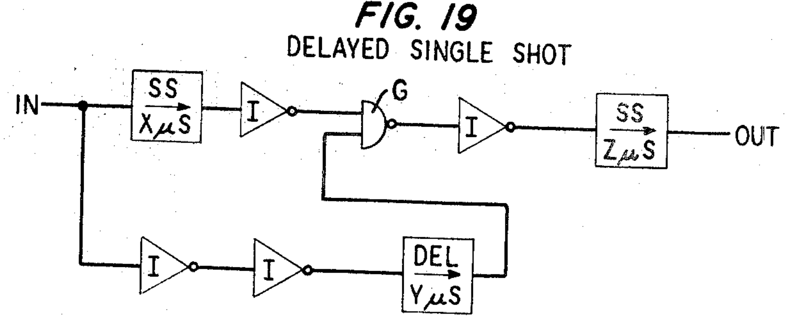

FIG. 19 shows how a delayed single-shot circuit may be made to produce a low-to-high output of a specified short width delayed a specified time from the controlling low-to-high transition of a longer input.

Figure 20:
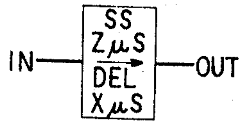

FIG. 20 shows the symbol of a delayed single-shot circuit like FIG. 19.

Figure 21:
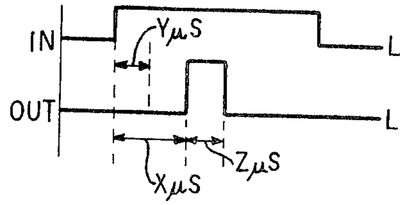

FIG. 21 shows the circuit action of the delayed single-shot. Under steady state conditions, the output is low from the single-shot $z$. No change at the input, except a low-to-high, will affect the output. When a low-to-high input occurs, the upper input of gate G goes low for $x$ μsec. and then returns to high and the lower input of gate G will stay low for $y$ μsec. and will then go high. As long as either input to gate G is low ($x$ μsec.), the output of gate G will be high. As soon as both inputs of gate G are high (at end of $x$ μsec.), the output of gate G will go low to provide a high-to-low transition at the input of single-shot $z$. The resulting output is a single-shot high of $z$ μsec. delayed $x$ μsec. from the controlling low-to-high input transition.

Regeneration Circuit

Figure 22:
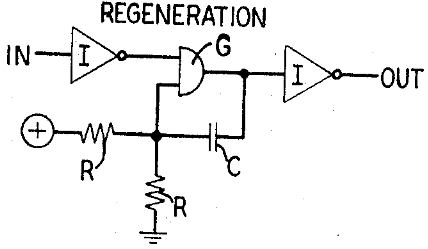

FIG. 22. shows how a regeneration circuit may be made for producing a relatively long low-to-high output from a shorter low-to-high input.

Figure 23:
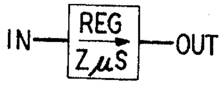

FIG. 23. shows the symbol for a regeneration circuit for producing a pulse of Z μsec. width.

Figure 24:
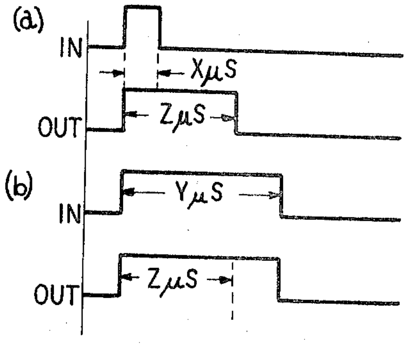

FIG. 24. shows the circuit action of a regeneration circuit like FIG. 22. Under steady state conditions the lower input to gate G is high and the output will be the same as the input. A high-to-low transition at the input will cause the output to go from high to low and to remain low as long as the input stays low. A low-to-high transition at the input will cause the output of gate G to go low and the main output to go high. The high-to-low output of gate G will be effective through capacitor C to drive the lower input of gate G low. This lower (low) input to gate G will maintain the output of gate G low until capacitor C can recharge through the connected circuitry to a point where its left electrode (lower input of gate G) has become sufficiently high to act as an enabling high for gate G. This delay time is Z microseconds. As in FIG. 24($a$), a shorter input ($X<Z$) will cause an output of length Z. As in FIG. 24($b$), a longer input ($Y>Z$) will cause an output of the length of the input (Y).

D-type Flip-Flop

Figure 25:
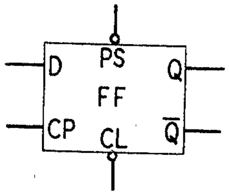

FIG. 25 shows a typical D-type flip-flop such as Texas Instruments integrated circuit Ser. No. 7474 and the like. D is the data input, CP is the clock pulse input, PS is the preset input, CL is the clear input, Q is the "1" output, and $\overline{Q}$ is the "o" output. With PS low and CL high, a preset condition exists with Q high and $\overline{Q}$ low. With PS high and CL low, a clear condition exists with Q low and $\overline{Q}$ high. With PS high and CL high, Q is made the same as the high or low condition of the D input when CP is pulsed low to high. At all other times, Q and $\overline{Q}$ are unaffected by changes on the D input. The following table summarizes the above:

| CP | D | PS | CL | Q | Q |
|---|---|---|---|---|---|
| X | X | L | H | H | L |
| X | X | H | L | L | H |
| P | L | H | H | L | H |
| P | H | H | H | H | L |

P ... means a pulse from low-to-high

L ... means low

H ... means high

X ... means not controlling.

Set-Reset Flip-Flop

Figure 26:
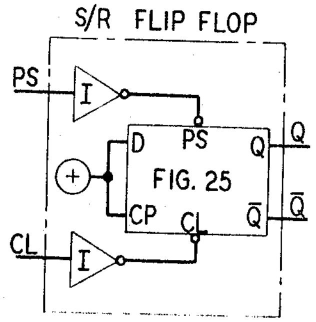
Figure 27:
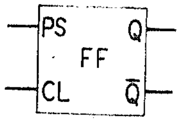

FIG. 26. shows how a flip-flop like FIG. 25 may be arranged to produce a S/R (set-reset) flip-flop, the symbol for which is shown in FIG. 27. In FIGS. 26 and 27, the respective present and clear inputs PS and CL are controllable by high-to-low pulses to respectively set (Q high and $\overline{Q}$ low) and reset (Q low and $\overline{Q}$ high) the flip-flop.

JK Flip-Flop

Figure 28:
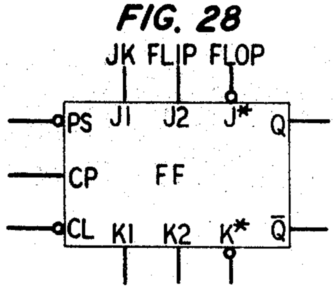
Figure 29:
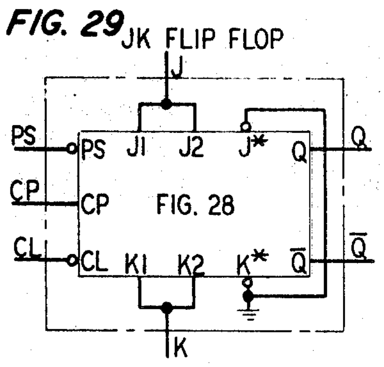
Figure 33:
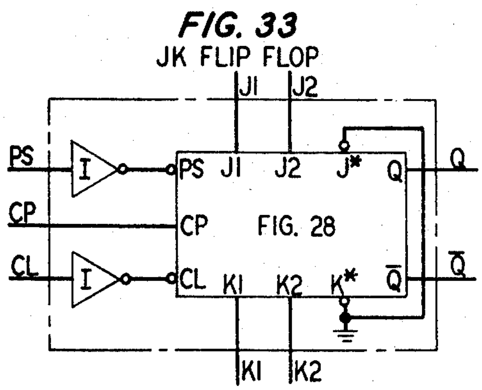

FIG. 28. shows a typical JK flip-flop such as Texas Instruments integrated circuit Ser. No. 7470 and the like. $\overline{PS}$ is preset, CP is clock pulse, CL is clear, Q is the "1" output, $\overline{Q}$ is the "0" output, and J1, J2, K1, K2, J* and K* are the various J and K inputs. Whenever the J* and K* inputs are not used, they are grounded as shown in FIGS. 29 and 33. If only one J or K input is used, the J1 and J2 or K1 and K2 or both are connected together as shown in FIG. 29. The J and K information is changed, if at all, when the CP input is low.

Figure 30:
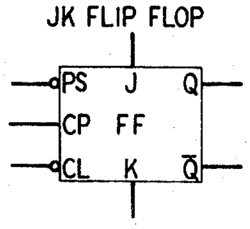

FIG. 30 is the symbol for the circuitry of FIG. 29. Here, when CP is low, a low on PS presets the flip-flop to Q high and $\overline{Q}$ low, and the low on CL clears the flip-flop to Q low and $\overline{Q}$ high. As long as the preset PS or clear CL is low, pulses on the CP input have no effect; the preset PS and clear CL must be high for pulses on the CP input to be effective. With J and K both low, a low-to-high pulse on CP does not effect the state of Q and $\overline{Q}$. When J and K are both high, a low-to-high pulse on CP will toggle the Q and $\overline{Q}$ outputs (change lows to highs and vice versa). With J low and K high, a low-to-high pulse on CP causes Q to be low and $\overline{Q}$ to be high. With J high and K low, a low-to-high pulse on CP causes Q to be high and $\overline{Q}$ to be low. The following table shows this circuit action:

| CP | J | K | Q | Q |
|---|---|---|---|---|
| P | L | L | X | X |
| P | H | H | T | T |
| P | L | H | L | H |
| P | H | L | H | L |

P ... means low-to-high

L ... means low

H ... means high

X ... means no change

T ... means toggle (high-to-low or vice versa).

Figure 31:
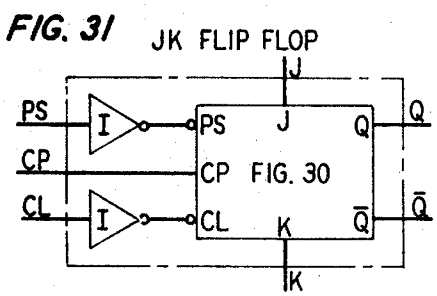
Figure 32:
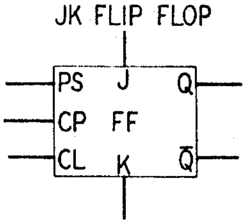

FIG. 31 shows how to modify the flip-flop of FIG. 30 so that the preset PS and clear CL inputs are responsive to highs instead of lows. The symbol for FIG. 31 is shown in FIG. 32.

Figure 34:
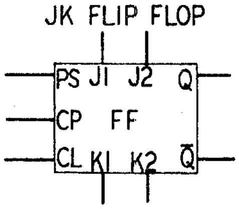

FIG. 33 shows how to modify the flip-flop of FIG. 28 so that the preset PS and clear CL inputs are responsive to highs instead of lows, so that the J* and K* inputs are not used, and so the J1, J2, K1 and K2 inputs are separately available. The symbol for FIG. 33 is shown in FIG. 34. Here, with CP low, a high on $\overline{PS}$ sets Q high and $\overline{Q}$ low and a high on CL clears Q to low and $\overline{Q}$ to high. With both J1 and J2 low and both K1 and K2 low, a high on CP does not change the state of Q and $\overline{Q}$. With all of the J and K inputs high, a high on CP toggles the Q and $\overline{Q}$ outputs. With either J1 or J2 low and both K1 and K2 high, a high on CP sets Q low and $\overline{Q}$ high. With both J1 and J2 high and K1 or K2 low, a high on CP sets Q high and $\overline{Q}$ low.

8421 BCD Counter

Figure 35:
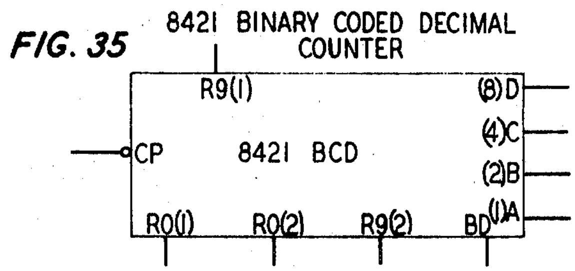

FIG. 35 shows the symbol of a typical decade counter such as Texas Instruments integrated circuit Ser. No. 7490 and the like. The binary coded decimal weighings of the output leads A, B, C and D are 1, 2, 4 and 8 respectively. Used as a symmetrical divide-by-by 10 counter, the D output is connected to the CP input, BD is the input, and A is the output. Used as a binary coded decimal counter, BD is connected to A, and CP is the input.

As a BCD counter, if RO(1) and RO(2) are high and at least one of R9(1) and R9(2) is low, the counter remains in state zero (0000). If R9(1) and R9(2) are high, counter remains in state nine (1001). is low and R9(1) or R9(2) is low, the following table shows the states of the A, B, C and D outputs as the clock pulse input CP (P) receives high-to-low pulses:

| CP | 1<br>A | 2<br>B | 4<br>C | 8<br>D | Decimal<br>Count |
|---|---|---|---|---|---|
| P | L | L | L | L | 0 |
| P | H | L | L | L | 1 |
| P | L | H | L | L | 2 |
| P | H | H | L | L | 3 |
| P | L | L | H | L | 4 |
| P | H | L | H | L | 5 |
| P | L | H | H | L | 6 |
| P | H | H | H | L | 7 |
| P | L | L | L | H | 8 |
| P | H | L | L | H | 9 |
| P | L | L | L | L | 0 |
| | | | etc. | | |

2421 BCD Counter

Figure 36:
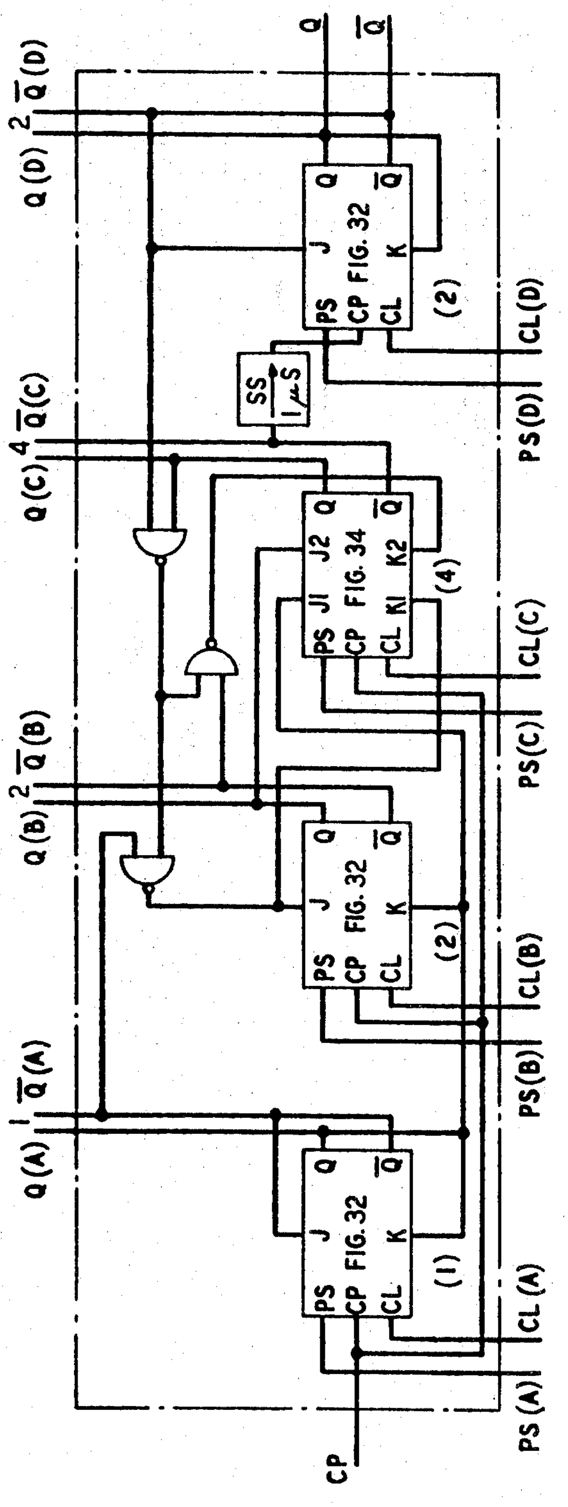

FIG. 36 shows how flip-flops like those of FIGS. 32 and 34 may be connected to produce a 2421 binary coded decimal counter. The 2421 code is a self-complementing binary-decimal coding.

Figure 37:
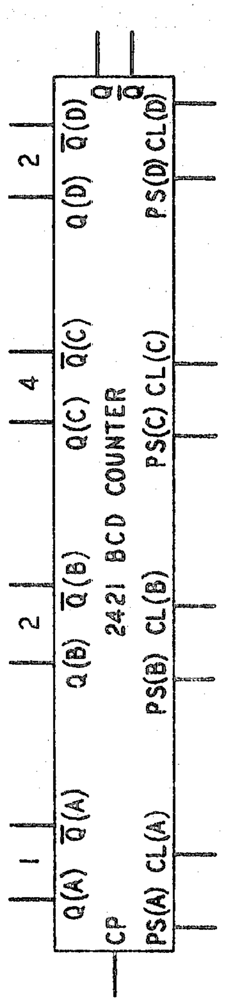

FIG. 37 is the symbol for the circuit of FIG. 36. With the clock pulse input CP low, a high on any present input PS sets the corresponding stage to Q high and $\overline{Q}$ low and a high on any clear input CL clears the corresponding stage to Q low and $\overline{Q}$ high. The following table shows the action of the circuit set for counting in response to low-to-high pulses (P) on input CP, outputs Q and $\overline{Q}$ being the same as outputs Q(D) and $\overline{Q}$(D).

| CP | 1<br>Q(A) | 2<br>Q(B) | 4<br>Q(C) | 2<br>Q(D) | Decimal<br>Count |
|---|---|---|---|---|---|
| P | L | L | L | L | 0 |
| P | H | L | L | L | 1 |
| P | L | H | L | L | 2 |
| P | H | H | L | L | 3 |
| P | L | L | H | L | 4 |
| P | H | H | H | | 5 |
| P | L | L | H | H | 6 |
| P | H | L | H | H | 7 |
| P | L | H | H | H | 8 |
| P | H | H | H | H | 9 |
| P | L | L | L | L | 0 |
| | | | etc. | | |

SIGNALS

Figure 2:
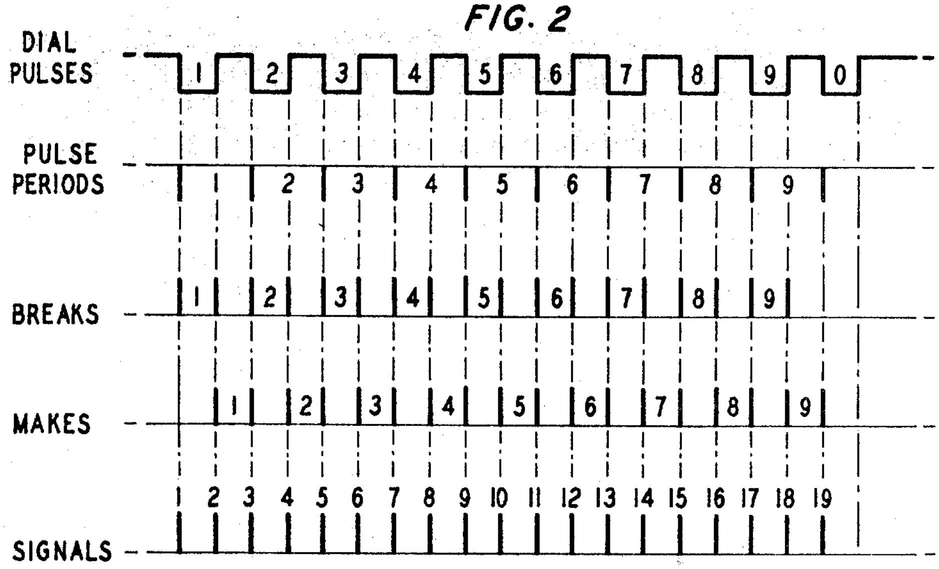
FIG. 2 is a chart illustrating various aspects of telephone dial pulses used by example as the source of time intervals to be measured; and, FIGS. 3 through 37 show circuit components and symbols used in the detailed circuitry of FIGS. 38, 39 and 40.

Since the exemplary disclosure is of part of a test set for measuring various aspects of telephone dial pulses, FIG. 2 is provided to explain the type of pulsing involved and the significant signals which can be derived from such pulsing.

The top line in FIG. 2 shows a series of ten break intervals and the nine intervening make intervals making up nine full-pulse periods. Nominally, telephone dials will pulse at the rate of about 10 pulses (pulse periods) per second with about 50–60 percent break and a corresponding 50–40 percent make (percentage of total pulse period). Of course, the pulsing speed and percentages can vary quite widely, as is well known. In FIG. 2, the top line designates the 10 break intervals, the second line designates the nine full-pulse periods, the third line designates the nine break intervals of the first nine pulse periods, and the forth line designates the nine make intervals of the first nine pulse periods. The fifth line shows the 19 signals (transitions) definitive of the parts of the first nine pulse periods.

In measuring dial pulses, or any other similar time interval phenomenon, it will be appreciated that any of the makes, breaks, pulse periods, or pulse transitions can be arranged by suitable well known circuitry to be of any desired polarity depending upon the requirements of the circuit controlled thereby. For example, in the detailed circuitry to be described hereinafter, it has been convenient to discuss responses to positive or high signals even though the particular time intervals of interest, such as the break intervals of FIG. 2, may sometimes be thought of in the opposite sense. Likewise, the make intervals will be considered as negative or low even though they may generally be considered in the reverse sense.

It is desirable when using clock-controlled measuring circuitry, as in the exemplary disclosure, to arrange the dial input circuit so that the input dial pulses are synchronized with the clock. This will insure that switching and logic functions are performed with the minimum amount of error. Such an arrangement for clock synchronization of otherwise random input pulses is disclosed and claimed in an application of R. B. Heick, Ser. No. 849,997, filed on Aug. 14, 1969, allowed on Dec. 16, 1970, and entitled "Delayed Clock Pulse Synchronizing of Random Input Pulses." However, as mentioned hereinafter, the present circuit can measure the input signals not synchronized with the clock pulses and can do so with negligible error.

BLOCK DIAGRAM

Figure 1:
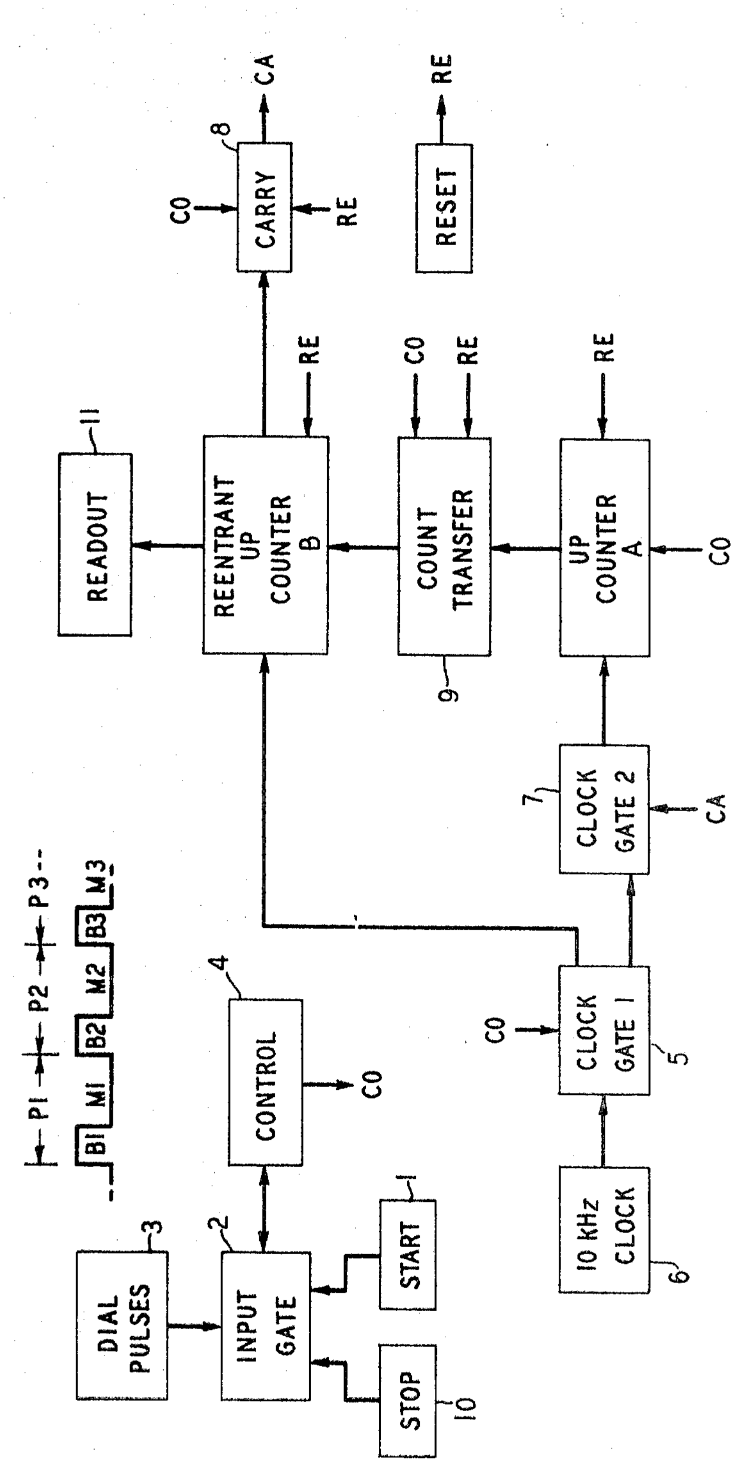
FIG. 1 is a block diagram of the detailed circuit embodiment shown in FIGS. 38, 39 and 40 arranged as shown in FIG. 41 (on same sheet as FIG. 1)

The block diagram of FIG. 1 shows the main functional parts of the detailed circuit of FIGS. 38, 39 and 40. Two full-pulse periods P1 and P2 and part of a third pulse period P3 are shown, each divided into break (B1, B2 and B3) intervals and make (M1, M2 and M3) intervals. The breaks have been shown as positive or high since the circuitry is arranged to be responsive to high signals (or low to high transitions) for measurement purposes and since it has been assumed that minimum break is to be measured.

The system is cleared for use by setting counter A to maximum count and setting reentrant counter B to zero count, counters A and B having the same count capacity. When the start circuit 1 is energized, the input gate 2 is enabled to be controlled by the input dial pulses 3. As the dial pulses arrive at the input gate 2, signals will pass from the input gate 2 to the control 4 so that the control 4 knows when break intervals B1, B2, B3, etc. begin and end.

At the start of the first break B1, the control 4, over control lead CO, resets counter A to zero count and enables clock gate 5 to pass clock pips from the 10 kHz. clock source 6 to counter B. The carry 8 was set by the clearing operation such as to provide on lead CA a signal enabling clock gate 7, thus allowing clock pulses to pass also to counter A. Clock pulses will be counted in both counters A and B during the first break B1.

At the end of the first break B1 (i.e., the start of the first make M1), the control 4, over lead CO, disables clock gate 5 to prevent passage of any further clock pulses through gates 5 and 7. Also at the end of break B1, the control 4, over lead CO, enables the count transfer 9. When the count transfer 9 is enabled, the nine's complement of the count in A is transferred into B as a new count in B. Counters A and B are arranged in a self-complementing binary code such that the transfer of one's and zero's in binary language is the same as the transfer of the nine's complement in decimal language.

At the start of the second break B2 (end of the first make M1), the control 4 disables the count transfer 9 over lead CO, then clears counter A (resets it to zero count), and again enables clock gate 5. Counter B still retains a pulse count indicative of the time duration of the first break B1, even though the count in B is in complementary form. Clock pips from the clock 6 are passed by gates 5 and 7 into counter B and counter A. Since counter B contains a count which is the complement of the previous count in counter A, and since counters A and B have the same count capacity, the number of clock pips required to cause counter B to arrive at capacity count is the same as the previous count in counter A.

If the second break B2 is equal to or of less duration than the first break B1, counter B will not exceed its capacity. In such a case, the end of the second break B2 will find in counter A a pip count indicative of break B2, which is not greater (not longer) than break B1. The control 4 will again disable clock gate 5, enable the count transfer 9, and reset counter A. Counter B will then contain the nine's complement of a pulse count indicative of the minimum break interval.

If the second break B2 is greater than (longer-of more duration) the first break B1, counter B will be driven by the serially fed clock pips to capacity count, then to zero count, and thus to another cumulative clock pip count until the end of break B2. When counter B goes from capacity count to zero count, the carry 8 is set to disable clock gate 7 over lead CA. Thus, further clock pips are prevented from being serially added into counter A. The result is that at the end break B2, counter A will contain a clock pip count representative of the previous (minimum, so far) break interval B1.

At the end of the second break B2, the control 4 again disables clock gate 5, enables the count transfer 9, and resets counter A.

The above process is repeated for each break interval B3, etc. until the circuit action is stopped, either manually or automatically. The circuit can be stopped manually at any time by manipulation of the stop circuit 10, whereupon the input gate 2 is disabled and the control 4 prevents any further circuit action. Although not shown in FIG. 1, means is provided whereby the control 4 may cause an automatic stop after having processed a prescribed number of time interval measurements.

The readout 11 is a combined decoder and lamp display device whereby the count existing in counter B after transfer (i.e., the then minimum break count) is decoded from the binary form in counter B into decimal form for lighting the display to show the minimum break in milliseconds.

The circuitry is arranged, as will be obvious, to measure makes or pulse periods if desired, in addition to breaks. All that is necessary is for the input circuit to arrange and feed to the input gate 2 the appropriate ones of the signals shown in FIG. 2.

DETAILED CIRCUIT DISCLOSURE

Figure 41:
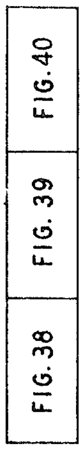

With reference to the detailed circuit disclosures of FIGS. 38, 39 and 40 (see FIG. 41 on same sheet as FIG. 1), certain switches and controls may warrant brief comment. In FIG. 39 are shown three make contacts designated MIN–1, MIN–2 and MIN–3 and in FIG. 40 is shown a make contact designated MIN–4. These contacts are closed when the MIN switch is operated to adjust the circuit for measuring a minimum time interval. In FIGS. 38, 39 and 40 are shown make contacts designated F4–1 through F4–13. These contacts are closed when the F4 switch is operated to adjust the circuit for measuring break intervals. In FIG. 39 are shown two make contacts designated MSEC<100–1 and MSEC>100–1 and in FIG. 40 are shown two make contacts designated MSEC<100–2 and MSEC>100–2. Contacts MSEC<100–1 and MSEC<100–2 are closed when switch MSEC<100 is operated to adjust the circuit for measuring intervals less than 100 milliseconds long. Contacts MSEC>100–1 and MSEC>100–2 are closed when switch MSEC>100 is operated to adjust the circuit for measuring intervals longer than 100 milliseconds. In FIG. 38 are shown three switches designated START, STOP and CLEAR, each involving a contact arm shown in contact with a break contact and movable into contact with a make contact. When a switch arm is moved, the break contact opens before the make contact closes; and, upon being released, the switch arm is biased to return to the position shown with the make contact opening before the break closes. In FIG. 38 is shown a make contact designated NORM. The NORM contact is closed whenever the NORM switch is operated to adjust the circuit for continuous operation. If the NORM switch is released (not operated), the NORM make contact will be open to permit the setting of the switches BCD1, BCD2, BCD4 and BCD8 in FIG. 38 to stop the circuit automatically after the processing of a number of time intervals according to the setting of the BCD switches.

Starting Conditions

The following test conditions are assumed:

1. switch F4 is operated to enable measurement of break intervals;
2. switch MIN is operated to enable measurement of minimum intervals;
3. switch MSEC<100 is operated since the intervals to be measured are less than 100 milliseconds in time duration;
4. the NORM switch is operated to allow continuous operation; and,
5. the break intervals to be measured, as shown in FIG. 1, are highs and the make intervals are lows from the DIAL PULSE INPUT box shown in FIG. 38.

With switch MSEC<100 closed, the decimal point lamp DECPT in FIG. 40, which is physically located between the readout circuits NX2 of FIG. 40 and NX1 of FIG. 39 will be lighted in an obvious circuit under control of closed contacts F4–13 and MSEC<100–2. The decoder and readout circuits NX1, NX2 and NX3, as previously mentioned, convert or decode the binary 2421 code in the upper register to decimal values for lighting decimal lamps (numbers 0 to 9). NX3 indicates the tens digit, NX2 indicates the units digit, and NX1 indicates the tenths digit. If switch MSEC>100 were operated (measuring times greater than 100 msec.), contact MSEC<100–2 in FIG. 40 would be open and contact MSEC>100–2 in FIG. 40 would be closed, to thus extinguish the decimal point lamp DECPT such that the respective readout circuits NX3, NX2 and NX1 would visually show the respective hundreds, tens and units digits of the time registered in the upper register.

Clearing the System

The circuit is cleared or normalized by the momentary operation of the CLEAR switch in the upper left part of FIG. 38. This switch operation results in the following circuit functions:

1. the START/STOP flip-flop FF1 and the INPUT flip-flop FF2 in FIG. 38 are cleared (i.e., set to zero output states with their Q outputs low and their $\overline{Q}$ outputs high); Q outputs high);
2. the lower register, consisting of counters CN6, CN7 and CN8 in FIGS. 39 and 40, is set to capacity count;
3. the upper register, consisting of counters CN3, CN4 and CN5 and FIGS. 39 and 40 is cleared (i.e., set to zero count);
4. the CARRY flip-flop FF3 in FIG. 40 is cleared i.e., set to zero state—Q output low and $\overline{Q}$ output high);
5. the counter CN1 and the switches BCD1, BCD2, BCD4 and BCD8 in FIG. 38 are not involved in the circuit operation when the NORM switch in FIG. 38 is operated, as assumed; and,
6. the divide-by-10 counter CN2 in FIG. 38 is ineffective since its 1 kHz. output is blocked by open contact MSEC>100–1 in FIG. 39.

Prior to the operation of the CLEAR switch, the clear input CL of FF1 is low since the three inputs to OR-gate G6 are low—one from the back contact of the CLEAR switch, one from the back contact of the STOP switch, and one from the output of AND-gate G5, the left input of which is held low through contacts F4–2 and NORM. Also, the clear input of FF2 is low since the two inputs to OR-gate G7 are low—one from the CLEAR switch and one from the output of gate G5. Also, the CP input of FF2 is held low from single-shot SS8. When the CLEAR switch is operated, the lower input to gate G6 and the upper input to gate G7 go high, thus applying a high to the clear inputs CL of FF1 and FF2, thus to clear FF1 and FF2.

The high on the clear lead 381 in FIG. 38 extends into FIG. 39, through OR-gate G9, contact F4–9 and contact MIN–1 to conductor 391. The high on lead 391 extends to the preset inputs PS(A), PS(B), PS(C) and PS(D) of counters CN6 (FIG. 39) and CN7 (FIG. 40). The high on lead 391 in FIG. 40 extends through OR-gate G36 to the preset inputs PS(A), PS(B), PS(C) and PS(D) of counter CN8. The right input to gate G36 is held low over lead 402 into FIG. 39 to ground. The high on the preset inputs of counters CN6, CN7, and CN8 sets these counters (the lower register) to capacity count (99.9) since the CP inputs are held low from single-shots DSSI, SS2 and SS3.

With the lower register (counters CN6, CN7 and CN8 of FIGS. 39 and 40) set to capacity count, all of the $\bar{Q}$ outputs—$\bar{Q}$(A) through $\bar{Q}$(D) of these counters—are low and the corresponding Q outputs are high. With the Q output of FF2 (FIG. 38) low, the output of gate G1 is low and the output of I1 is high on lead 382, which extends into FIG. 39, through closed contact F4–11, and to lead 393 of FIGS. 39 and 40. This high on lead 393 in FIGS. 39 and 40 causes the outputs of the transfer gates G12, G14, G16 and G18 of FIG. 39 and G20, G22, G24, G26, G28, G30, G32 and G34 of FIG. 40 to go high to apply a high clear signal to the CL inputs—CL(A) through CL(D)—of the upper register consisting of counters CN3, CN4 and CN5 of FIGS. 39 and 40. This causes the upper register to be set to zero count with all of its Q outputs—Q(A) through Q(D)—low and all of its $\bar{Q}$ outputs—$\bar{Q}$(A) through $\bar{Q}$(D)—high, since the CP inputs of CN3, CN4 and CN5 are held low from single-shots SS4, SS5 and SS6.

The high on lead 393 in FIG. 40 is also applied to the clear input CL of the carry flip-flop FF3, thus setting its Q output high since its CP input is held low from single-shot SS7.

When the momentarily operated CLEAR switch in FIG. 38 is released, it returns to the condition shown with a low again applied to the lower input of gate G6, to the upper input of gate G7, and to the clear lead 381. This returns the clear inputs CL of FF1 and FF2 in FIG. 38 to low and returns to low the preset inputs PS(—) of the lower register in FIGS. 39 and 40.

Priming the Input Flip-flop

With the circuit cleared or normalized, as above, and the CLEAR switch in FIG. 38 returned to its normal condition as shown, the START switch in FIG. 38 is momentarily operated to prepare the input flip-flop FF2 of FIG. 38 to respond to the first break interval (high) of the input dial pulses. Prior to the operation of the START switch, the START/STOP flip-flop FF1 is set to zero (Q low and $\bar{Q}$ high), as a result of the prior clearing operation. The J and K inputs of FF2 were thus held respectively low and high through respective contacts F4–1 and F4–3 from the Q and $\bar{Q}$ outputs of FF1. Under these J and K input conditions, FF2 cannot respond to a pulse on its input lead CP, which is connected through single-shot SS8 and contact F4–4 to the input dial pulses. The momentary operation of the START switch applies a high to the single-shot SS1, which produces a 1 msec. high at the input PS of FF1, which sets FF1 to the one state (Q high and $\bar{Q}$ low). This in turn, sets the J and K inputs of FF2 to respective high and low conditions to enable FF2 to respond to a pulse on its CP input. The release of the START switch has no further effect.

First Break Interval

As previously explained, the DIAL PULSE INPUT in FIG. 38 is arranged to feed dial pulses through contact F4–4 to the left input to gate G1 and to the CP input of FF2 through single-shot SS8, with break intervals high and make intervals low. The dial pulse input is also applied to lead 387 into FIG. 39 and through contacts MIN–2 and F4–7 to the input of the delayed single-shot DSS3, for a purpose to be described.

The first break applies a high through contact F4–4 to single-shot SS8, which produces a short high pulse at the CP input of FF2 to set FF2 to the one state (Q high and $\bar{Q}$ low). This first high break also enables gate G1 to repeat the high break at its output, in turn producing a low at the output of I1 on lead 382. The low on lead 382 extends through contact F4–5 to produce a high at the output of I3 on lead 385. The low on lead 382 extends into FIG. 39 and through contact F4–11 to lead 393 (extending into FIG. 40) to disable the transfer gates G11 through G34 of FIGS. 39 and 40. The high on lead 385 in FIG. 38 enables gate G2 to pass high 10 kHz. clock pulses (of say 50 $\mu$sec. high and 50 $\mu$sec. low) to lead 383, into FIG. 39, through contacts MSEC<100–1 and F4–6 to the CP input of counter CN3 (through single-shot SS4) and to the input of regeneration circuit REG feeding the delayed single-shot DSS1. Also, the high on lead 386 in FIG. 38 (Q output of FF2) extends into FIG. 39 and to the upper input of gate G37 to enable gate G37 to pass a high pulse from delayed single-shot DSS3. Counter CN3 (with its initial zero count) will start counting the high 10 kHz. clock pulses on its CP input from SS4. The delayed single-shot DSS3 will produce a 1 $\mu$sec. high at its output after a delay of 10 $\mu$sec. This high pulse at the output of DSS3 extends through gate G37 to lead 396, which extends through gate G10 to lead 392, connected to the clear inputs CL(A)–CL(C)–CL(D) of counters CN6 and CN7 in FIGS. 39 and 40, to reset counters CN6 and CN7 to zero count—all Q(—) outputs low and all $\bar{Q}$(—) outputs high. The high pulse on lead 396 extends into FIG. 40 and through gate G35 to the clear inputs CL(—) of counter CN8 to set that counter to zero. The other two inputs of gate G10 in FIG. 39 are held low, one directly to ground, the other to ground through contact MIN–3. The left input of gate G35 in FIG. 40 is held low over lead 403 into FIG. 39 to ground over contact MIN–3. The high pulse on the clear inputs of counters CN6, CN7 and CN8 will override any low-to-high transition which might possibly occur at the inputs CP of these counters at this time. Gate G3 in FIG. 39 is enabled at this time by a high on its lower input over lead 401 (and through contact MIN–4) from the high $\bar{Q}$ output of the carry flip-flop FF3 in FIG. 40. Delayed single-shot DSS1 in FIG. 39 will delay each regenerated high clock pulse transition on its input and will produce a 1 $\mu$sec. pulse output some 20 $\mu$sec. later. These delayed clock pulses will be passed through gate G3 and contact F4–10 to the CP input of counter CN6.

The first high break thus (1) allows clock pulses to be counted in counter CN3 of FIG. 39, (2) clears the entire lower register—counters CN6, CN7 and CN8 of FIGS. 39 and 40, and (3) allows delayed clock pulse counting in counter CN6 after the lower register clearing operation.

With regard to the upper register (counters CN3, CN4 and CN5 of FIGS. 39 and 40) and the lower register (counters CN6, CN7 and CN8 of FIGS. 39 and 40), both registers will start from zero count and will accumulate the 10 kHz. clock pulses serially applied to the inputs CP of counters CN3 and CN6 in FIG. 39. When counters CN3 and CN6 go from a count of nine to a count of zero, their $\bar{Q}$ outputs produce a low-to-high transition. Counter CN3 applies this high transition over lead 394, through single-shot SS5, and over lead 397 into FIG. 40 to the CP input of counter CN4 to inject one count therein. Counter CN6 applies the high transition to single-shot SS2 in FIG. 39, which repeats a short (1 $\mu$sec.) high pulse through gate G4, over lead 395 into FIG. 40 and to the input CP of counter CN7 to inject one count therein. Similarly in FIG. 40, counters CN4 and CN7 will inject one count each into counters CN5 and CN8 for every 10 counts in themselves.

For the duration of the first high break interval, 10 kHz. clock pulses are serially added into both the upper and lower registers. If, for example, the first break should last for 53.4 msec., the following action takes place:

1. the first nine clock pulses drive counters CN3 and CN6 (FIG. 39) to counts of nine;

2. the tenth clock pulse returns counters CN3 and CN6 to zero to add one count into respective counters CN4 and CN7 of FIG. 40;

3. the twentieth clock pulse again returns counters CN3 and CN6 to zero to add a second count into counters CN4 and CN7; 4. whenever counters CN4 and CN7 are driven from a count of nine to a count of zero, one count is added into respective counters CN5 and CN8 in FIG. 40;

5. the 530th clock pulse will have driven counters CN3 and CN6 to zero, driven counters CN4 and CN7 to counts of three, and driven counters CN5 and CN8 to counts of five, and, 6. the 534th clock pulse will have driven counters CN3 and CN6 to counts of four.

As outlined above, assuming the first high break to last for 53.4 msec., each of the upper and lower registers will have counted 534 clock pulses at 10 kHz. Counters CN5 and CN8 are set at five, counters CN4 and CN7 are set at three, and counters CN3 and CN6 are set at four.

First Make Interval

At the end of the first high break interval (the beginning of the first low make interval), the following circuit action takes place:

1. the left input of gate G1 in FIG. 38 goes low to provide a low input to I1, which produces a high on lead 382;

2. the high on lead 382 extends through contact F4–5 to produce a low output from I3 on lead 385 to disable gate G2, thus stopping any further 10 kHz. clock pulses from being applied over lead 383 into the registers of FIGS. 39 and 40;

3. the high on lead 382 in FIG. 38 extends into FIG. 39, through contact F4–11, and over lead 393 to the left inputs of the transfer gates G11 through G34 of FIGS. 39 and 40 to transfer to the upper register (CN3, CN4 and CN5) the nine's complement (one's complement in the 2421 binary code) of the count then in the lower register (CN6, CN7 and CN8);

4. the lower register count which is transferred as the nine's complement to the upper register will include the last delayed clock pulse counted in counter CN6 of FIG. 39 (through delayed single-shot DSS1) since the transfer enabling high on lead 393 will still be effective when that delayed clock pulse is added into counter CN6; and, 5. the transfer enabling high on lead 393 in FIGS. 39 and 40 also retains the carry flip-flop FF3 of FIG. 40 in the cleared condition ($\bar{Q}$ output high), to in turn keep gate G3 in FIG. 39 enabled.

With regard to the transfer, it will be noted in FIGS. 39 and 40 that the $\bar{Q}$(−) output leads from the counters CN6, CN7 and CN8 control the PS(−) inputs of the counters CN3, CN4 and CN5 and that the Q(−) outputs of the lower register control the CL(−) inputs of the upper register. This means that while the transfer gates are enabled by the high on lead 393, the upper counters will be set at the complement of whatever is in the lower counters, which is why the self-complementing 2421 code is used here. For instance, in the assumed case where the lower counters contain the count of 534 (CN8, CN7, CN6), the nine's or one's complement of 465 (CN5, CN4, CN3) will be transferred to the upper counters. Looking at counters CN6 and CN3 of FIG. 39, with a 4 registered in CN6, its outputs $\bar{Q}$(A), $\bar{Q}$(B), Q(C) and $\bar{Q}$(D) will be high and its outputs Q(A), Q(B), $\bar{Q}$(C) and Q(D) will be low. The highs on outputs $\bar{Q}$(A), $\bar{Q}$(B), Q(C) and $\bar{Q}$(D) will pass through gates G11, G13, G16 and G17 to apply highs to inputs PS(A), PS(B), CL(C) and PS(D) to set stages A, B, C and D of counter CN3 to respective states of 1101 to represent a 5 in the 2421 binary code. Thus, counter CN3 of the upper register is set to the nine's complement (5) of the 4 currently in counter CN6 of the lower register. Similarly, the 3 in counter CN7 of FIG. 40 is transferred to counter CN4 as a 6 (A, o–B, o–C, 1'–D, 1) and the 5 in counter CN8 is transferred to counter CN5 as a 4 (A, o–B, o–C, 1–D, 0).

At this point, the decoder and readout circuits NX1, NX2 and NX3 of FIGS. 39 and 40 will decode the 2421 binary coding of the upper register into a decimal indication of the nine's complement to light three numeral lamps—a 5 for NX3, a 3 for NX2 and a 4 for NX1. With the decimal point lamp DECPT lit (and physically located between NX1 and NX2 of FIGS. 39 and 40), the readout circuits, when physically reversed (left to right) will provide a visual readout of 53.4 msec.

Second Break Interval

At the start of the second high break (end of the first low make), gate G1 in FIG. 38 again provides a high output to cause a low output from I1 on lead 382. As at the beginning of the first break, above described, the following action takes place:

1. the low on lead 382 extends into FIG. 39 and through contact F4–11 to lead 393 to disable the transfer gates G11 through G34 of FIGS. 39 and 40;

2. the low on lead 382 extends through contact F4–5 to produce a high output from I3 on lead 385 at the upper input to gate G2;

3. gate G2 passes the high 10 kHz. clock pulses to lead 383 into FIG. 39, thence over contacts MSEC<100–1 and F4–6 to the CP input of counter CN3 (through single-shot SS4) and to the regenerated input of delayed single-shot DSS1;

4. the high on lead 387 in FIG. 38 (high input break) extends into FIG. 39 and through contacts MIN–2 and F4–7 to the input to delayed single-shot DSS3;

5. the high clock pulses at the CP input of counter CN3 in FIG. 39 are serially added to the count in the upper register (CN3, CN4, CN5) during the second high break interval;

6. delayed single-shot DSS3 in FIG. 39 produces a 1 $\mu$sec. high pulse (delayed 10 $\mu$sec.) through gate G37 to lead 396 and through gates G10 and G35 of FIGS. 39 and 40 to clear (set to zero count) the counters CN6, CN7, and CN8 of the lower register; and, 7. delayed. single-shot DSS1 in FIG. 36 produces, for all regenerated high clock pulse transitions, one microsecond high pulses (delayed 20 $\mu$sec.) through gate G3 and contact F4–10, as delayed clock pulses, to the CP input of counter CN6 to serially add clock pulses into the cleared lower register.

Thus, during the second high break interval, the lower register is reset to zero count, the clock pulses are serially added to the previous count in the upper register, and delayed clock pulses are serially added into the cleared lower register. It will be recalled, in the assumed example, that the previous count existing in the upper register is a count of 465 clock pulses (CN5–4, CN4–6 and CN3–5), which is the nine's complement of the first break interval count of 534 clock pulses (53.4 msec.).

If the second break lasts just as long as the first one (53.4 msec.), then 534 clock pulses will be serially added into the upper register to cause it to advance from the count of 465 to a count of 999. If the second break is shorter than the first break, then the upper register will advance to some count less than 999. If the second break is longer than the first one, the upper register will be driven to a count of 999, then to 000, and then to some value higher than zero.

If the second break is equal to or shorter than the first break, the count in the lower register will equal the clock pulse count during the second break, which is the minimum so far. If the second break is longer than the first break, the lower register will accumulate no clock pulses beyond the measure of the second break, which would be the minimum so far.

Second Break Not Longer than First Break

Assuming that the second break is exactly the same (53.4 msec.) as the first break, or shorter than the first break, the upper register will be driven to a count of 999 or less. The only time that a low-to-high transition is available at the $\bar{Q}$ output of counter CN5 in FIG. 40 is when counter CN5 is driven from a count of 9 to a count of 0, this can happen only if the upper register is advanced from a count 999 to a count of 000. The carry flip-flop FF3 in FIG. 40 is normally cleared with its $\overline{Q}$ output high. FF3 requires a low-to-high transition on its CP input in order to toggle it (change $\overline{Q}$ from high to low). Thus, under the assumption, FF3 will retain its high $\overline{Q}$ output, which extends through contact MIN–4 and over conductor 401 into FIG. 39 to keep gate G3 enabled. The lower register will thus accumulate a clock pulse count for the entire second break interval.

If it be assumed that the second break is of the same duration (53.4 msec.) as the first break, then the lower register will accumulate a count of 534 clock pulses, which is still the minimum so far (53.4 msec.).

If it be assumed that the second break is shorter in duration (say 52.8 msec.) than the first break (53.4 msec.), then the lower register will accumulate a count of 528 clock pulses (52.8 msec.) since that will be the full-clock pulse count for the shorter second break. Thus, the lower register will contain the minimum count of 528.

At the end of the second break, as discussed previously with respect to the end of the first break, clock gate G2 in FIG. 38 is disabled to stop further clock pulses from being applied over lead 383 to the upper and lower registers of FIGS. 39 and 40, the carry flip-flop FF3 in FIG. 40 is retained in the cleared state ($\overline{Q}$ output high), and the transfer gates G11 through G34 of FIGS. 39 and 40 are enabled to set the upper register to the nine's complement of the count then in the lower register. If the second break is the same as the first break, the lower register will contain a count of 534 and the upper register will have transferred to it, as a new count, the count of 465. If the second break is shorter than the first break, say 52.8 msec., then the lower register will contain a count of 528 and the upper register will have transferred to it, as a new count, the count of 471.

Second Break Longer than First Break

If break second break is longer than the first break, the clock pulse count serially added into the upper register (existing count is the nine's complement of the previous minimum) will cause the upper register to exceed its capacity. This will stop further clock pulses from being accumulated serially in the lower register so that the lower register will retain the previous minimum count.

Clock pulses will be serially added to the count of 465 (46.5) in the respective counter CN5, CN4 and CN3 of the upper register in FIGS. 39 and 40. The first 534 clock pulses will cause the upper register to arrive at a count of 999 while the lower register is accumulating the same 534 clock pulses as a new count.

For example, let it be assumed that the second break lasts long enough (54.9 msec.) to cause 589 clock pulses to be added into the upper register. This will cause the upper register (counters CN5, CN4, CN3) to go to a count of 999 in response to the first 534 clock pips, to a count of 000 on the 535th clock pip, and to a count of 054 on the 589th clock pip. When the upper register goes from the count of 999 to the count of 000, the $\overline{Q}$ output of counter CN5 in FIG. 40 carries a low-to-high transition, which is effective through single-shot SS7 to toggle the carry flip-flop FF3 to change its $\overline{Q}$ output from high to low. This low on the $\overline{Q}$ output of FF3 extends through contact MIN–4 and over lead 401 into FIG. 39 to the lower input of gate G3 to disable gate G3 from passing any further delayed clock pulses to the CP input of counter CN6. In the meantime, the lower register has accumulated the same 534 clock pip count which caused the upper register to arrive at the 999 count. The 535th clock pip, which causes the upper register to go from 999 to 000, to in turn toggle the carry flip-flop FF3, is delayed for 20 μsec. in the delayed single-shot DSS1 in FIG. 39. Gate G3 at the input of counter CN6 in FIG. 39 is disabled by the toggled flip-flop FF3 before the delayed 535th clock pip is applied to the upper input of gate G3; thus, the count of 534 is as far as the lower register can go.

At the end of the second break (58.9 msec.–589 count), the lower register will have a count of 534 (53.4 msec.) and the upper register will have a count of 054. The 534 in the lower register is the previous (and still) minimum.

Again, as above discussed, at the end of the second break (beginning of the second make) the transfer lead 393 in FIGS. 39 and 40 will become high to clear the carry flip-flop FF3 (reset $\overline{Q}$ output to high) and to enable the transfer gates G11 through G34 of FIGS. 39 and 40 to set the upper register to the nine's complement of the pulse count then in the lower register (the minimum so far). Also, as above discussed, at the beginning of the third break (end of second make) the lower register will be cleared (reset to a count of zero).

Additional Break Intervals

The above process will continue until the circuit action is stopped either (1) by the dial pulse input at the left input of gate G1 in FIG. 38 remaining low (continuous make) or (2) by operation of the STOP switch in FIG. 38.

If the break pulsing (highs) stop being supplied by the dial pulse input in FIG. 38, gate G2 in FIG. 38 will remain disabled and the lower and upper registers will contain their last pulse counts, namely the respective minimum break count and its nine's complement.

If it is desired to manually stop the circuit action at any time, the STOP switch in FIG. 38 may be momentarily operated. A momentary operation of the STOP switch will apply a high to the upper input of gate G6, which will repeat this high to the clear input CL of the START/STOP flip-flop FF1 to clear it so its respective Q and $\overline{Q}$ outputs go low and high. This reverses the conditions at the J and K inputs of the input flip-flop FF2 (J goes from high to low and K goes from low to high) so that, upon the next ensuing make-to-break (low to high) transition of the input dial pulses, the input flip-flop FF2 will be cleared or reset (Q output goes from high to low and $\overline{Q}$ output goes from low to high). This transition of the input dial pulses from low to high extends through contact F4—4 and single-shot SS8 IN FIG. 38 to the input CP of FF2 to toggle FF2 to the clear or reset condition. When the latter occurs, the Q output of FF2 will apply a low to the right-hand input of gate G1 to disable gate G1 from passing any further dial pulse transitions to inverter I1, etc. Also, the low Q output of FF2 on lead 386 will disable gate G37 in FIG. 39 to prevent clearing of the lower register when delayed single-shot DSS3 in FIG. 39 produces a delayed high pulse in response to the low-to-high input pulse transition on lead 387 from FIG. 38.

Automatic Circuit Stopping

The four ganged BCD- switches in the left part of FIG. 38, along with the 8421 BCD counter CN1 in FIG. 38, are used to stop the circuit action after the processing of a prescribed number of measured intervals. If, for instance, it is desired to measure the minimum break over 5 pulse periods, the BCD-switches will be set to 5 with the NORM switch unoperated; this will cause the circuit operation to stop at the leading edge (low-to-high) of the sixth break.

When the circuit is cleared or normalized, as previously discussed, the high from the $\overline{Q}$ output of the input flip-flop FF2 extends to the R9(1) input of counter CN1 to set that counter to 9 (i.e., outputs B and C are low and outputs A and D are high). The four diodes DA, DB DC and DD act such that if any of the outputs A, B, C and D of counter CN1 is low, the left-hand terminal of the corresponding diode will be held low and any switch wiper (BCD1, BCD2, BCD3 or BCD4) connected thereto will be held low. Since all of the switch wipers are connected in parallel to resistance R1 and to lead 384, which extends through contact F4–2 to the left input of gate G5, the output of gate G5 will be held low, if any connected diode is low. Conversely, the output of gate G5 can go high only if the four switch wipers are in a position where all of the connected diodes DA, DB DC, and DD are connected to high outputs A, B, C and D of counter CN1. In the assumed case, where the switches are set on 5, the lead 384 can go high only when the outputs A and C (1 and 4) of counter CN1 are both high, which occurs only when counter CN1 is advanced to a count of 5, which occurs on the leading edge of the sixth break. Counter CN1 advances from its starting condition of 9 to 0, 1, 2, 3, 4, 5, etc.

Whenever counter CN1 reaches the prescribed count (the leading edge of the sixth break interval), the left input of gate G5 will go high to allow a high pulse from the delayed single-shot DSS2 in FIG. 38, as will be explained, to clear the START/STOP and input flip-flops FF1 and FF2 to stop the circuit action.

When the circuit is in operation it will be recalled that flip-flops FF1 and FF2 are in the set condition (Q outputs high and $\bar{Q}$ outputs low). Each low-to-high transition at the leading edge of each high break interval will, as previously discussed, produce a high at the output of gate G1. The high at the output of gate G1 causes the delayed single-shot DSS2 to produce at the right input of gate G5 a short high pulse (about 1 microsecond) delayed about 1 microsecond. This pulse will have no effect unless the left input of gate G5 is high at that time. The low-to-high pulse at the output of gate G1 also causes inverter I2 to produce a high-to-low transition at the input CP of counter CN1. The $\bar{Q}$ output of the input flip-flop FF2 is applying a low to input R9(1) of counter CN1 to enable it to respond to low pulses on its input CP. The counter CN1 thus advances one count at the leading edge of each high break interval.

The first break (high leading edge) will advance the counter CN1 from its initial setting of 9 (B and C outputs low and A and D outputs high) to a count of 0 (all outputs A, B, C and D low). The leading edge of the second break causes counter CN1 to advance to a count of 1 (A output high and outputs B, C and D low). The third break causes counter CN1 to advance to a count of 2 (output B high, outputs A, C and D low). The fourth break causes counter CN1 to advance to a count of 3 (outputs A and B high, outputs C and D low). The fifth break causes counter CN1 to advance to a count of 4 (output C high, outputs A, B and D low). The leading edge of the sixth break causes counter CN1 to advance to a count of 5 (outputs A and C high, outputs B and D low). With outputs A and C of counter CN1 both high, lead 384 will go high to enable gate G5. The delayed high pulse from delayed single-shot DSS2 will produce a high pulse on the output of gate G5 to clear both flip-flops FF1 and FF2 (Q outputs low and $\bar{Q}$ outputs high) to stop the circuit operation.

Due to the 1 microsecond delay in delay single-shot DSS2 in FIG. 38 and its 1 $\mu$sec. pulse output, it is possible, but not likely, for part of a clock pulse to reach the input CP of counter CN3 in FIG. 39. This could add one clock pulse to the count in the upper register; this is of no consequence, however, since with switch MSEC<100 operated, the possible readout error is only one-tenth of a millisecond (out of perhaps 50 msec.) and with switch MSEC>100 operated, the possible readout error is only 1 msec. (out of perhaps hundreds). Also, the Q output of FF2 in FIG. 38 will go low on lead 386 into FIG. 39 soon enough to disable gate G37 in FIG. 39 so that the lower register will not be cleared from delayed single-shot DSS3. Thus, any extra clock pip count in the upper register is of no consequence since the accurate count in the lower register will be transferred to the upper register by a high on the transfer lead 393 in FIGS. 39 and 40 as soon as the Q output of FF2 in FIG. 38 goes low.

Although not disclosed, in actual practice the input interface (such as the DIAL PULSE INPUT box in FIG. 38) would be arranged such that the input pulse transitions are synchronized with the clock pulse source, as suggested hereinbefore. This would insure that any significant transition of the input occurs when the clock output was low, thus preventing the otherwise most unlikely appearance of any part of one extra clock pulse at the input CP of counter CN3 in FIG. 39 when the circuit action is stopped. However, as mentioned above, nonsynchronous action injects no error of any consequence, if any at all.

Measuring Interval Greater Than 100 Milliseconds

The previous description assumed that the switch MSEC<100 was operated (and switch MSEX>100 released) to allow measurement and readout of break intervals less than 100 msec. in duration. This assumed the closing of contacts MSEC<100–1 and the opening of contact MSEC>100–1 in FIG. 39, and the closing of contact MSEC<100–2 and the opening of contact MSEC>100–2 in FIG. 40. That situation allowed 10 kHz. clock pulses from FIG. 38 to be passed through gate G2 into FIG. 39 and to the upper and lower registers. This allowed counters CN5 and CN8 (FIG. 40) to count tens of milliseconds, counters CN4 and CN7 (FIG. 40) to count units of milliseconds, and counters CN3 and CN6 (FIG. 39) to count tenths of milliseconds, and counters CN3 and CN6 (FIG. 39) to count tenths of milliseconds.

If switch MSEC>100 is operated and switch MSEC<100 is released, in FIG. 39 contact MSEC>100–1 would be closed and contact MSEC<100–1 would be open. This prevents the 10 kHz. clock pulses from being used for counting purposes and allows the 2421 BCD counter CN2 in FIG. 38 to be used to produce 1 kHz. clock pulses on its $\bar{Q}$ output, which extend over the 1 kHz. clock pulse lead into FIG. 39 and through closed contact MSEC>100–1 to the counters of FIGS. 39 and 40. Under these circumstances, counters CN5 and CN8 (FIG. 40) will represent hundreds of milliseconds, counters CN4 and CN7 (FIG. 40) will represent tens of milliseconds and counters CN3 and CN6 (FIG. 39) will represent units of milliseconds.

When the circuit is cleared or normalized, as previously discussed, the $\bar{Q}$ output of flip-flop FF2 in FIG. 38 is made high, which produces a high at the output of gate G8 in FIG. 38. The high output of gate G8 will set the counter CN2 to a count of 5 upon the occurrence of the first low clock pulse from the 10 kHz. source. This means that stages A, B and D are set to state one (preset) and stage C is set to state zero (cleared). Under these circumstances the $\bar{Q}$ output of counter CN2, which is the same as the $\bar{Q}$(D) output, is low. As long as the output of gate G8 is high, any high clock pulses at input CP of counter CN2 do not change the preset count of 5.

When the circuit is started, flip-flop FF2 is set (Q output high and $\bar{Q}$ output low) to cause gate G1 to have a high output during breaks (highs) and a low output during makes (lows) and to cause gate G8 to have a low output during breaks (highs) and a high output during makes (lows). Thus, the output of gate G8 will allow the 10 kHz. clock pulses (highs) to advance the count in counter CN2 during breaks, to again preset counter CN2 to 5 during makes, and to prevent the 10 kHz. clock from advancing count CN2 during makes.

As counter CN2 advances its count during the break interval being measured, it advances one count for each one-tenth of a millisecond under control of the 10 kHz. clock. The count will advance from 5 to 6 to 7 to 8 to 9 to 0 to 1 to 2, to 3 to 4 to 5, etc. Only when the count advances from 9 to 0 does the $\bar{Q}$ output of counter CN2 go from low to high; at other times, the $\bar{Q}$ output either stays high, stays low, or goes from high to low. Each time the $\bar{Q}$ output goes from low to high (once from each ten clock pulses of 10 kHz.), the 1 kHz. lead carries a high clock pulse at the rate of 1 kHz.

The fact that counter CN2 must count five 10-kHz. clock pulses before producing the first 1-kHz. clock pulse injects an error in the timing of the break interval of one-half millisecond, which is of no great consequence when measuring intervals greater than 100 msec. in duration.

As soon as the end of the break (high) occurs, the right input of gate G8 will go high to preset counter CN2 to a count of 5 and to stop the 10-kHz. clock from controlling counter CN2 for the duration of the make.

It is to be understood that the above-described arrangement is illustrative of the application of the principles of the invention. Numerous other arrangements may be devised by those skilled in the art without departing from the spirit and scope of the invention.

We claim:

1. Circuitry for measuring the minimum time interval between pairs of signals among a plurality of such pairs comprising:

A. a first register;

B. a second register;

C. means controlled by a first pair of signals for causing the second register to contain a registration indicative of the time interval between the signals of the first pair;

D. and, means controlled by the second register and by each pair of signals succeeding the first pair 1. for comparing the new time interval between the signals of such succeeding pair with the old time interval indicated by the registration in the second register, 2. for causing the first register to contain a registration indicative of the shorter of the new and old time intervals, 3. and for causing the registration in the second register to equal the registration in the first register.

2. Circuitry for measuring the minimum time interval between pairs of signals among a plurality of such pairs comprising:

A. a source of pulses recurring at a constant frequency substantially greater than the recurrence frequency of the two signals of each pair;

B. a first pulse count register;

C. a second pulse count register;

D. means controlled by a first pair of signals for causing the second register to contain a pulse count indicative of the number of pulses from the source occurring during the time interval between the signals of the first pair;

E. and, means controlled by the second register and by each pair of signals succeeding the first pair 1. for comparing the number of pulses from the source occurring during the new time interval between the signals of such succeeding pair with the old pulse count in the second register, 2. for causing the first register to contain a pulse count indicative of the number of pulses from the source occurring during the shorter of the new and old time intervals, 3. and for causing the second register to contain a pulse count indicative of the pulse count in the first register.

3. Circuitry for measuring the minimum time interval between pairs of signals among a plurality of such pairs comprising:

A. a first register;

B. a second register;

C. means controlled by a first pair of signals for causing the registers to contain registrations indicative of the time interval between the signals of the first pair;

D. means controlled by each pair of signals succeeding the first pair for causing the second register to change its old registration to a new registration indicative of the difference between the new time interval between the signals of such succeeding pair and the old time interval indicated by the old registration;

E. and, means controlled by the second register during the time interval between the signals of such succeeding pair for causing the first register to contain a registration indicative of the shorter of the new and old time intervals.

4. The invention defined in claim 3 wherein the means controlled by a first pair of signals comprises:

A. means controlled by the first pair of signals for causing the first register to contain a registration indicative of the time interval between the signals of the first pair B. and means controlled by the first pair of signals for causing the second register to contain a registration indicative of the time interval indicated by the registration in the first register.

5. The invention defined in claim 4 wherein the means controlled by the first pair of signals for causing the second register to contain a registration indicative of the time interval indicated by the registration in the first register comprises means controlled by the later occurring signal of each pair for causing the second register to contain a registration indicative of the time interval indicated by the registration then in the first register.

6. Circuitry for measuring the minimum time interval between pairs of signals among a plurality of such pairs comprising:

A. a source of pulses recurring at a constant frequency substantially greater than the recurrence frequency of the two signals of each pair;

B. a first pulse count register;

C. a second pulse count register;

D. means controlled by a first pair of signals for causing the registers to contain pulse counts indicative of the number of pulses from the source occurring during the time interval between the signals of the first pair;

E. means controlled by each pair of signals succeeding the first pair for causing the second register to change its old pulse count to a new pulse count indicative of the difference between the new time interval between the signals of such succeeding pair and the old time interval indicated by the old pulse count;

F. and, means controlled by the second register during the time interval between the signals of such succeeding pair for causing the first register to contain a pulse count indicative of the number of pulses from the source occurring during the shorter of the new and old time intervals.

7. The invention defined in claim 6 wherein the means controlled by a first pair of signals comprises:

A. means controlled by the first pair of signals for causing the first register to contain a pulse count indicative of the number of pulses from the source occurring during the time interval between the signals of the first pair;

B. and means controlled by the first pair of signals for causing the second register to contain a pulse count indicative of the pulse count in the first register.

8. The invention defined in claim 7 wherein the means controlled by the first pair of signals for causing the second register to contain a pulse count indicative of the pulse count in the first register comprises means controlled by the later-occurring signal of each pair for causing the second register to contain a pulse count indicative of the pulse count then in the first register.

9. Circuitry for measuring the minimum time interval between pairs of signals among a plurality of such pairs comprising:

A. a source of pulses recurring at a constant frequency substantially greater than the recurrence frequency of the two signals of each pair;

B. a first pulse count register;

C. a second pulse count register;

D. means controlled by the earlier occurring signal of each pair for causing the pulse count in the first register to equal zero;

E. means for causing pulses from the source to be counted in the first register during the first time interval between the signals of a first pair;

F. means controlled by the later occurring signal of each pair for causing the second register to contain a pulse count indicative of the pulse count then in the first register;

G. means controlled by each pair of signals succeeding the first pair for causing the second register to change its old pulse count to a new pulse count indicative of the difference between the new time interval between the signals of such succeeding pair and the old time interval indicated by the old pulse count;

H. and, means controlled by the second register during the time interval between the signals of such succeeding pair for causing the first register to count all source pulses not exceeding the shorter of the new and old time intervals.

10. Circuitry for measuring the minimum time interval between pairs of signals among a plurality of such pairs comprising:

A. a source of pulses recurring at a constant frequency substantially greater than the recurrence frequency of the two signals of each pair;

B. a first pulse count register of a given count capacity;

C. a second pulse count register of the same given count capacity;

D. means for causing pulses from the source to be counted in the first register during the first time interval between the signals of a first pair;

E. means controlled by the later-recurring signal of each pair for causing the second register to contain a pulse count equal to the complement of the pulse count then in the first register;

F. means controlled by each pair of signals succeeding the first pair for adding source pulses to the pulse count in the second register during the time interval between the signals of such succeeding pair;

G. and, means controlled by the second register during the time interval between the signals of such succeeding pair for causing the pulse count in the first register to equal the sum of all source pulses not exceeding the capacity of the second register during the time interval.

11. Circuitry for measuring the minimum time interval between pairs of signals among a plurality of such pairs comprising:

A. a source of pulses recurring at a constant frequency substantially greater than the recurrence frequency of the two signals of each pair;

B. a first pulse count register of a given count capacity;

C. a second pulse count register of the same given count capacity;

D. means controlled by the earlier-occurring signal of each pair for causing the pulse count in the first register to equal o;

E. means for causing pulses from the source to be counted in the first register during the first time interval between the signals of a first pair;

F. means controlled by the later-occuring signal of each pair for causing the second register to contain a pulse count equal to the complement of the pulse count then in the first register;

G. means controlled by each pair of signals succeeding the first pair for adding source pulses to the pulse count in the second register during the time interval between the signals of such succeeding pair;

H. and, means controlled by the second register during the time interval between the signals of such succeeding pair for causing the first register to count all source pulses not exceeding the capacity of the second register during the time interval.

12. The invention defined in claim 11 wherein:

A. the second register comprises an up-counter responsive to each pulse transmitted thereto to increase by one the pulse count therein;

B. and, the means for adding source pulses to the pulse count in the second register comprises first gating means controlled by a pair of signals for allowing source pulses to be transmitted to the up-counter during the time interval between the signals of the pair.

13. The invention defined in claim 12 wherein:

A. the first register comprises a first up-counter responsive to each pulse transmitted thereto to increase by one the pulse count therein;

B. the second register-up-counter comprises a second up-counter;

C. and, the means for causing the first register to count all source pulses not exceeding the capacity of the second register comprises second gating means controlled by the second up-counter during the time interval between the signals of a pair for allowing all source pulses not exceeding the capacity of the second up-counter during the time interval to be transmitted to the first up-counter.

14. The invention defined in claim 13 wherein:

A. the second up-counter includes means for providing a control signal upon the addition to the second up-counter of a source pulse exceeding the capacity thereof;

B. and, the second gating means is controlled by the control signal to prevent further source pulses from being transmitted to the first up-counter.

15. The invention defined in claim 14 wherein:

A. the second up-counter comprises a plurality of binary counting stages settable from capacity count to zero count upon the addition of a source pulse;

B. and, the means for providing a control signal comprises a control signal generator controlled by the second up-counter to generate the control signal whenever the second up-counter is set from capacity count to zero count.

16. The invention defined in claim 15 wherein:

A. the first up-counter comprises a plurality of binary counting stages equal in number to the plurality of stages equal in number to the plurality of stages in the second up-counter;

B. and, the means for causing the second register to contain a pulse count equal to the complement of the pulse count in the first register comprises a plurality of transfer gates connected between the first and second up-counters and controlled by the later-occurring signal of a pair to transfer to the second up-counter as a new count therein the complement of the count then existing in the first up-counter.

17. The invention defined in claim 16 wherein the first gating means comprises a first gate connected between the source of pulses and the second up-counter.

18. The invention defined in claim 17 wherein the second gating means comprises a second gate connected between the first gate and the first up-counter.

19. The invention defined in claim 16 wherein:

A. the means for causing source pulses to be counted in the first register during the first interval between the first pair of signals comprises means effective prior to measurement of time intervals for registering capacity count in the first up-counter by setting all stages thereof to binary one;

B. and, the means controlled by the earlier-occurring signal of each pair for causing the pulse count in the first register to equal o comprises resetting means for resetting all stages of the first up-counter to binary zero.

20. The invention defined in claim 19 wherein the means for causing source pulses to be counted in the first register during the first time interval between the first pair of signals also comprises means effective prior to measurement of time intervals for registering zero count in the second up-counter by setting all stages thereof to binary zero.

* * * * *